United States Patent
Filippi et al.

(10) Patent No.: US 7,378,065 B2
(45) Date of Patent: May 27, 2008

(54) HEAT EXCHANGE UNIT FOR PSEUDO-ISOTHERMAL REACTORS

(75) Inventors: Ermanno Filippi, Castagnola (CH); Enrico Rizzi, Grandate (IT); Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 143 days.

(21) Appl. No.: 10/407,598

(22) Filed: Apr. 4, 2003

(65) Prior Publication Data

US 2004/0071606 A1 Apr. 15, 2004

(30) Foreign Application Priority Data

Apr. 5, 2002 (EP) .................................. 02007725

(51) Int. Cl.
*B01J 8/02* (2006.01)
(52) U.S. Cl. .................. 422/198; 422/129; 165/157
(58) Field of Classification Search ................ 422/129, 422/261, 198, 211, 126; 165/146, 157, 177, 165/147, 148, 46
See application file for complete search history.

(56) References Cited

U.S. PATENT DOCUMENTS

| | | | |
|---|---|---|---|
| 2,262,158 A | * | 11/1941 | Beam .......................... 165/147 |
| 5,031,692 A | * | 7/1991 | Kehrer et al. ............ 165/134.1 |
| 5,035,867 A | | 7/1991 | Dang Vu et al. |
| 5,405,586 A | | 4/1995 | Koves |
| 2002/0088613 A1 | * | 7/2002 | Filippi et al. ................ 165/182 |
| 2002/0161243 A1 | | 10/2002 | Zehner et al. |

FOREIGN PATENT DOCUMENTS

| | | |
|---|---|---|
| DE | 100 31 347 A1 | 1/2001 |
| EP | 1 153 653 A1 | 11/2001 |
| EP | 1 306 126 A1 | 5/2003 |
| WO | WO-95/01834 A1 | 1/1995 |

OTHER PUBLICATIONS

Dictionary definition of "Box" , see The American Heritage® Dictionary of the English Language, Fourth Edition Copyright © 2007, 2000 by Houghton Mifflin Company. Updated in 2007. Published by Houghton Mifflin Company. All rights reserved. More from Dictionary.*

* cited by examiner

*Primary Examiner*—Gladys J P Corcoran
*Assistant Examiner*—Sean E. Conley
(74) *Attorney, Agent, or Firm*—Akerman Senterfitt

(57) ABSTRACT

A heat exchange unit for axial and radial pseudo-isothermal reactors which comprise a substantially cylindrical shell (2) closed at the opposite ends by base plates (3, 4), a reaction zone (6) containing a catalytic bed and at least one heat exchanger (11) of the type with a plate having a variable section along the direction of the flow of operating heat exchange fluid.

11 Claims, 4 Drawing Sheets

HEAT EXCHANGE UNIT FOR PSEUDO-ISOTHERMAL REACTORS

FIELD OF THE INVENTION

In its most general aspect the present invention refers to a pseudo-isothermal reactor for heterogeneous chemical reactions comprising a substantially cylindrical shell closed at the opposite ends by respective base plates, a reaction zone containing at least one catalytic bed and a heat exchange unit comprising a plurality of heat exchangers immersed in said catalytic bed.

In the rest of the description and in subsequent claims, with the terms: pseudo-isothermal reactors we mean to refer to the type of chemical reactor in which the reactions are carried out at a temperature controlled within the tightest possible range of values around a predetermined optimal value.

Moreover and with reference to the main axis of the reactor, the crossing of the catalytic bed by the reactants and by the reaction products can take place both in the axial direction (axial reactor) and in the radial direction (radial reactor).

More specifically, but not exclusively, this invention refers to a heat exchange unit for axial and radial pseudo-isothermal reactions, comprising a plurality of heat exchangers of the so called plated type, immersed in the mass of catalyst of the respective catalytic bed.

PRIOR ART

As is known, controlling the temperature at which a chemical reaction takes place is of great importance, since the performance and yield of the process of said reaction depend upon it and the control of such a temperature is carried out by supplying or taking away heat, in the appropriate manner, to or from the environment in which said reaction is realised.

For such a purpose, heat exchangers, crossed by an operating fluid responsible for transporting heat, are widely used.

In the case of chemical reactors of the type considered (axial pseudo-isothermal reactors) heat exchange units are used consisting of a plurality of plate-shaped, boxed heat exchangers, immersed in the mass of catalyst.

Although they are advantageous from some points of view, such heat exchange units do not guarantee a satisfactory degree of isothermicity of the chemical reaction being carried out, with consequent negative repercussions on the yield of the reaction itself.

Indeed, also due to the structure, shape and size of the heat exchangers which form said unit, the operating fluid which crosses each heat exchanger undergoes a substantial temperature variation; this variation leads to a gradual reduction of the temperature difference ($\Delta T$) between the operating fluid and the catalytic bed where the reaction takes place and thus to a reduction of the heat exchange capability between the reaction zone and the operating fluid. A reduction of the heat exchange capability, as is known, involves a worsening of the efficiency of the exchanger and therefore a limited reaction yield.

SUMMARY OF THE INVENTION

The technical problem which forms the basis of the present invention is that of realising a heat exchange unit for axial or radial pseudo-isothermal reactors, the heat exchangers of which have structural and functional characteristics which allow the heat exchange capability between the reaction zone and the operating fluid which crosses said exchangers to be kept substantially constant.

The aforementioned technical problem is solved according to the invention by a heat exchange unit for pseudo-isothermal reactors of the type considered comprising at least one plate-shaped boxed heat exchanger formed from a pair of juxtaposed metallic plates, spaced apart and joined around the edge, defining an inner chamber intended for being crossed, along a predetermined direction, by an operating heat exchange fluid, characterised in that said inner chamber has a variable size increasing or decreasing in the aforementioned direction.

The main advantage of a heat exchange unit according to the invention consists of the possibility of increasing or decreasing the heat exchange capability in predetermined zones of said unit, differentiated along the direction itself.

Indeed, in the exchangers of a heat exchange unit thus constructed, the speed of said fluid varies in an inverse proportional manner with respect to the width of the passage section, because, as is known, the flow rate of the entering operating heat exchange fluid is constant. From this it can be derived that, if said passage section narrows along the flow direction, an increase of the speed of the operating fluid along the same direction is obtained. If we assume a constant $\Delta T$ along all of the length of the exchanger, since the heat exchange capability is a function, besides of the aforementioned $\Delta T$, also of the speed of the operating fluid, the heat exchange capability of the heat exchanger increases along the direction of the flow of the operating fluid. Therefore, if for example the $\Delta T$ between the operating fluid and the reaction zone decreases along the same direction, it is possible to control the pseudo-isothermicity of the reaction.

Further characteristics and advantages of the present invention shall become clearer from the detailed description of an example embodiment of a pseudo-isothermal chemical reactor comprising a heat exchange unit according to the finding, made hereafter with reference to the attached drawings, given only for indicating and not limiting purposes.

DETAILED DESCRIPTION OF THE FIGURES

Figure 1:
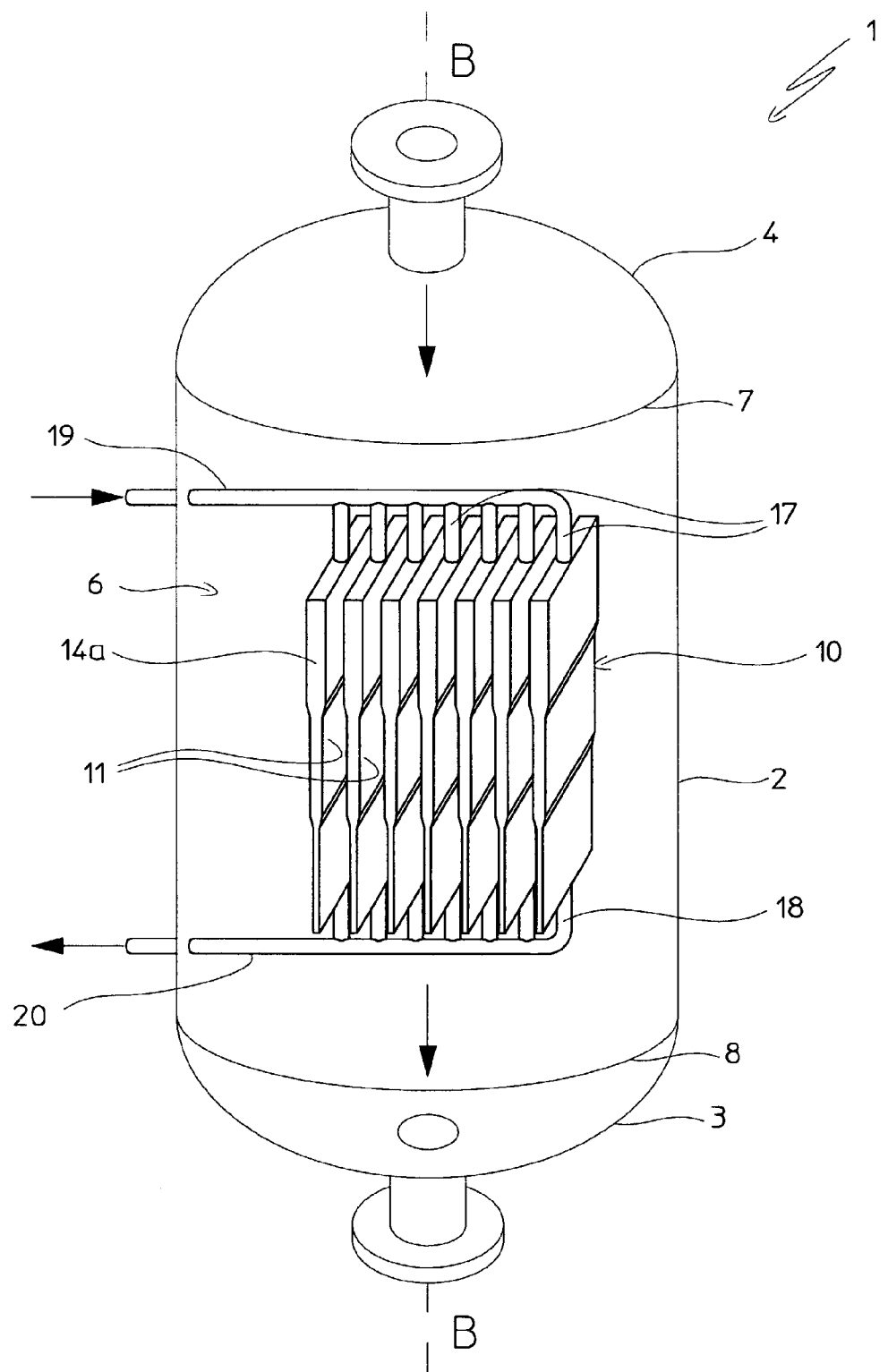
FIG. 1 schematically shows an axial flow pseudo-isothermal chemical reactor comprising a heat exchange unit according to the present invention.
Figure 2:
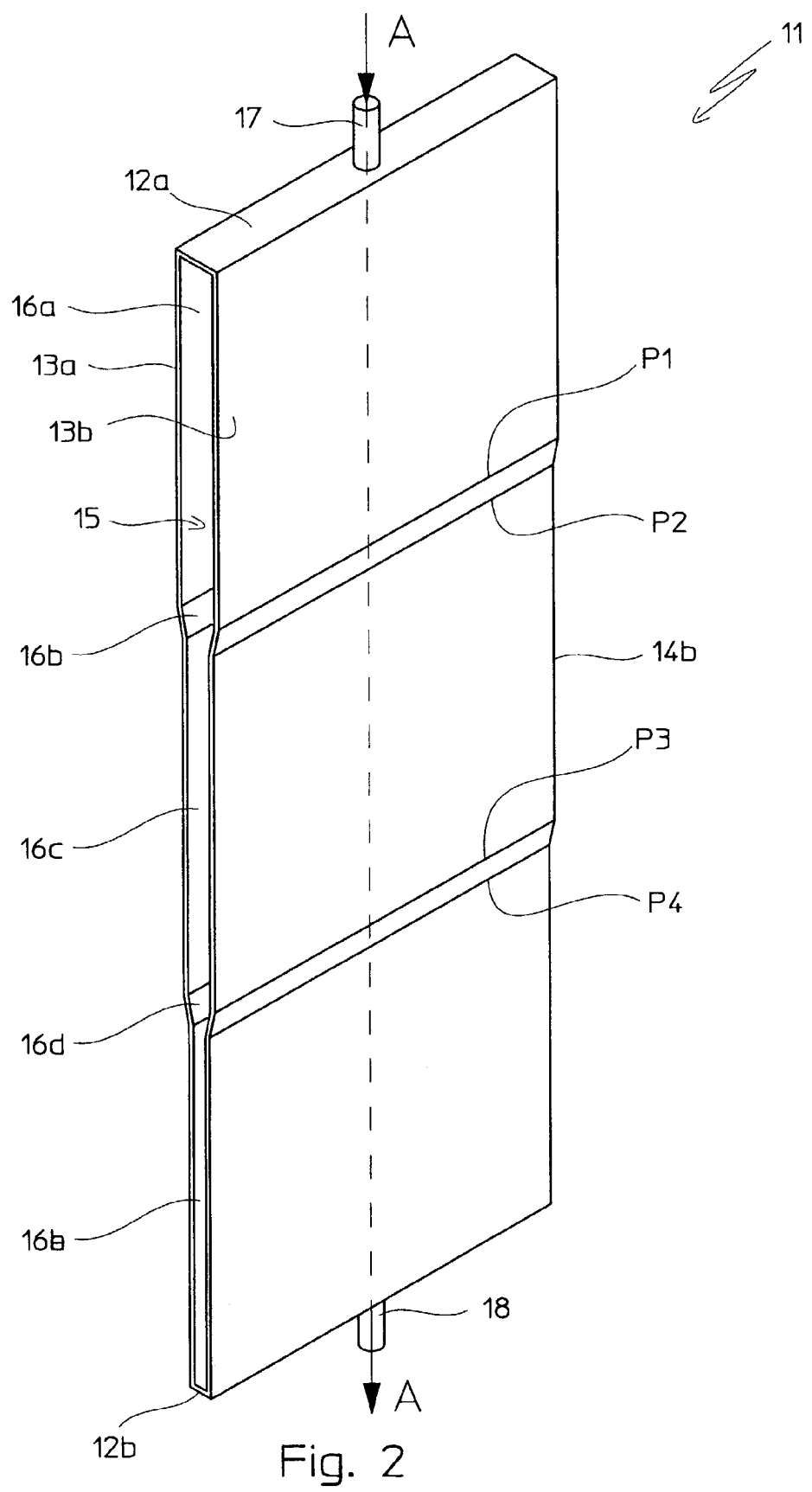
FIG. 2 shows an enlarged perspective view of a detail of the heat exchange unit of FIG. 1.

With reference to the FIGS. 1 and 2, with 1 a pseudo-isothermal reactor of the axial type comprising a cylindrical shell 2 with a vertical axis BB, closed at the opposite ends by respective lower and upper base plates 3 and 4, is wholly and schematically represented.

Inside the shell 2 a reaction zone 6 is defined, indicatively contained within an upper line 7 and a lower line 8, to receive a catalytic bed, which is not described in detail since it is per se known, intended for being crossed axially by the reactant gases and by the reaction products.

In the reaction zone a heat exchange unit is supported, globally indicated with 10, immersed in a mass of an appropriate catalyst, not represented, which constitutes the catalytic bed. Said heat exchange unit 10 comprises a plurality of heat exchangers 11.

In particular, each heat exchanger 11 is essentially plate-shaped forming a flattened box, and consists (FIG. 2) of a pair of juxtaposed metallic plates 13a, 13b, joined around the outside and spaced apart, so as to define an inner chamber 15.

Such metallic plates 13a and 13b are preferably rectangular, having short sides 12a and 12b and long sides 14a and 14b.

Said exchanger 11 is equipped, preferably on the opposite short sides 12a and 12b, with respective inlet and outlet connections 17, 18 for an operating heat exchange fluid, whose flow direction through the exchanger is indicated by the arrows AA, arranged on the axis which crosses the two connections 17, 18.

Figure 4:
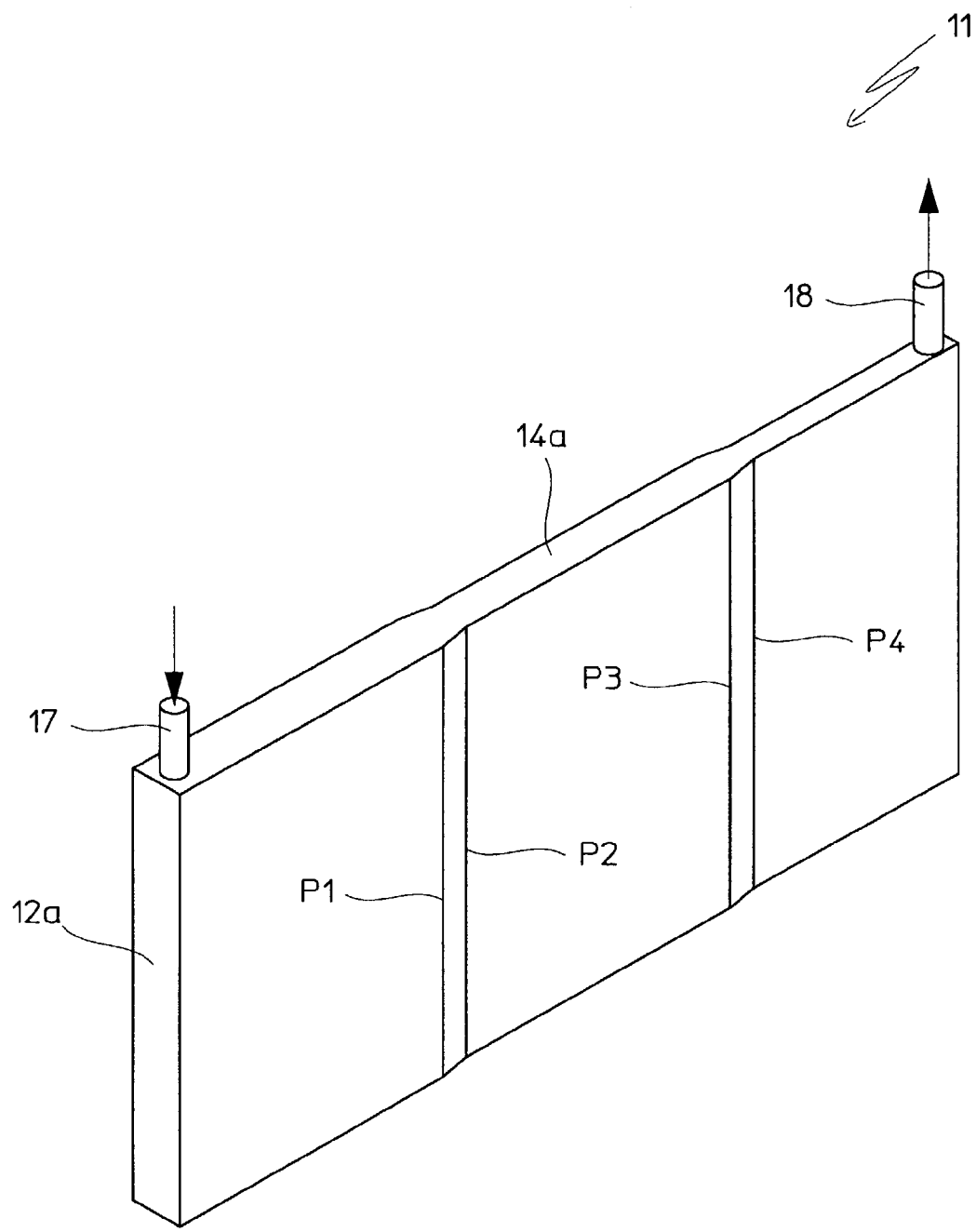
FIG. 4 shows an enlarged perspective view of a further variant of FIG. 2.

According to a variant embodiment of the present invention, suitably applied to a radial reactor, said connections 17 and 18 are situated on the same long side 14a as the exchanger,(FIG. 4).

In accordance with the present invention, said chamber 15 has a variable width along the flow direction (AA); i.e. the distance between the plates 13a and 13b increases or decreases along said direction AA.

In the case of an exothermal reaction, where to promote the reaction it is necessary to convey the heat produced by it and the production of heat increases as the reaction progresses, the width of the plate decreases along the direction AA and consequently the speed of the fluid increases as it crosses the chamber 15. As the speed of the operating fluid increases, the heat exchange capability of the fluid itself consequently also increases, and thus the amount of heat exchanged also increases, in particular removed at the reaction zone by the operating fluid inside the exchanger. All of this makes a substantial contribution to the optimisation of the control of the reaction temperature and of the pseudo-isothermicity of the reaction.

According to an embodiment of the present invention, in the inner chamber 15 three zones 16a, 16c, 16e are defined, following each other in the aforementioned flow direction AA of the operating fluid, each of the three having a width which is constant, but different with respect to the other two zones. More specifically, said width shall be at a maximum in zone 16a, minimum in zone 16e and intermediate between these two in 16c. Said zones 16a, 16c, 16e communicate with each other through connection zones 16b, 16d which converge in said direction AA. Said connection zones 16b, 16d can, for example, be defined by appropriate pairs of fold lines (P1 and P2 respectively above and below zone 16b; P3 and P4 respectively above and below zone 16d) realised in the opposite plates.

Figure 3:
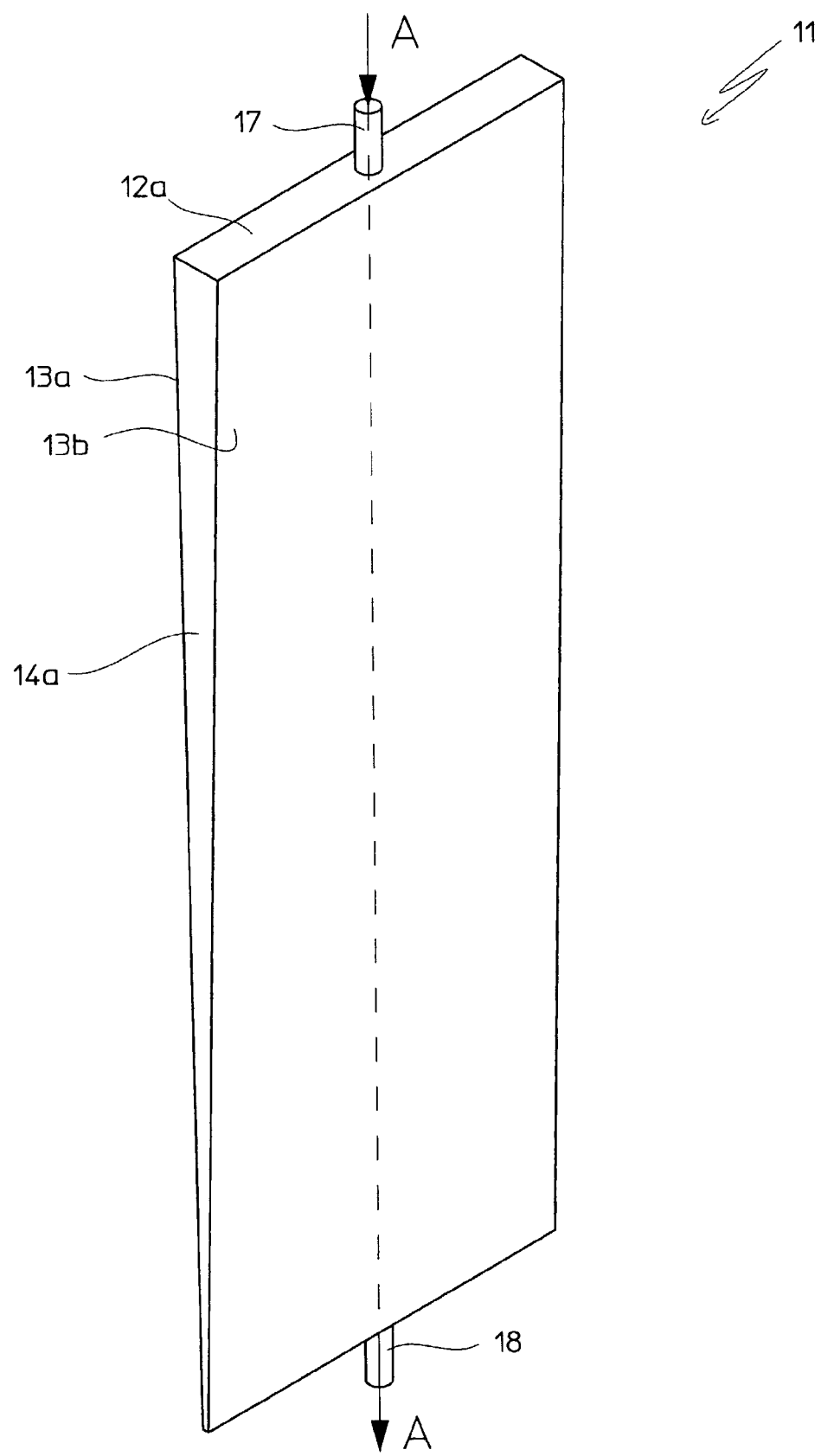
FIG. 3 shows an enlarged perspective view of a variant of FIG. 2.

According to a preferred embodiment of the present invention (FIG. 3), in said inner chamber 15 a single zone is defined. Such zone has a width which is variable along the flow direction and, more precisely, which varies in a continuous manner.

The inlet and outlet connections 17 and 18, respectively, of the heat exchangers 11, are connected and fixed to an upper feeding pipe 19 and a lower discharge pipe 20, respectively, for a predetermined operating heat exchange fluid; through said pipes the exchangers can advantageously be stiffened in a single structure to form said unit 10.

Advantageously and still in the case of an exothermic reaction, said operating heat exchange fluid consists of a mixture of reactant gases which thus undergo preheating.

In case the reactor is of the type equipped with a manhole, said exchangers 11 are each advantageously realised so as to have predetermined transversal sizes less than those of said manhole, so as to allow an easy passage through said opening.

The invention thus conceived is susceptible to variants and modifications which all fall within the scope of protection defined by the following claims.

For example, according to a preferred embodiment of the present invention, a second flow of operating fluid having a respective predetermined entry temperature is fed into said at least one heat exchanger and into at least one intermediate portion of said route.

By appropriately choosing the entry temperature of the second flow of operating fluid and the number of said intermediate positions, in correspondence with which a mixing of it with the fluid of said first flow takes place, it is possible to take the temperature of the operating fluid to the entry temperature or at least to a temperature very close to it. Therefore, it is possible to control the temperature of the operating heat exchange fluid within a very tight range of values around a predetermined value, if not indeed to keep the temperature of said fluid substantially constant, whilst it crosses the respective exchanger.

It should be noted that the aforementioned shell 2 can be completely new or else can consist of the shell of an already existing pseudo-isothermal reactor, recovered with the prior removal of the inner apparatuses (case of revamping a reactor intended to be scrapped). Else it may consist of the shell of an already existing adiabatic reactor, also emptied of the inner apparatuses (case of transformation of a reactor from adiabatic into pseudo-isothermal).

Indeed, the exchangers 11, object of the present invention, can easily be inserted and mounted to replace every piece of apparatus removed from inside the recovered shell.

It should be noted that the optimisation of the heat exchange achieved in a completely new reactor with an exchange unit according to the present invention is equally obtained in reactors realised in accordance with the cases of revamping and transformation quoted above.

The invention claimed is:

1. A pseudo-isothermal reactor of the axial or radial type comprising a substantially cylindrical shell closed at the opposite ends by base plates, a reaction zone containing a catalytic bed, and at least one heat exchange unit immersed in said catalytic bed, the heat exchange unit comprising:
    at least one flattened box-shape heat exchanger formed from a pair of juxtaposed metallic plates, spaced apart and joined around at their edges, defining an inner chamber intended for being crossed, along a predetermined direction, by an operating heat exchange fluid,
    wherein said inner chamber has a variable size increasing or decreasing in the predetermined direction, and
    wherein said chamber has at least two successive zones defined along the direction of the fluid, having different widths, in fluid communication with each other, the width within each successive zone being constant.

2. The pseudo-isothermal reactor according to claim 1, wherein said successive zones with different widths communicate with each other through connection zones.

3. The pseudo-isothermal reactor according to claim 2, wherein said connection zones converge in the direction of the operating fluid which crosses the chamber.

4. The pseudo-isothermal reactor according to claim 2, wherein said connection zones diverge in the direction of the operating fluid which crosses the chamber.

5. The pseudo-isothermal reactor according to claim 1, wherein said metallic plates are rectangularly-shaped.

6. The pseudo-isothermal reactor according to claim 2, wherein said connection zones comprise folds in the sheet of said metallic plates.

7. The pseudo-isothermal reactor according to claim 3, wherein said connection zones comprise folds in the sheet of said metallic plates.

8. The pseudo-isothermal reactor according to claim 4, wherein said connection zones comprise folds in the sheet of said metallic plates.

9. A pseudo-isothermal reactor of the axial or radial type comprising a substantially cylindrical shell closed at opposed ends by base plates, a reaction zone containing a catalytic bed and at least one heat exchange unit immersed in said catalytic bed, the heat exchange unit comprising at least one heat exchanger comprising:

a pair of separate metallic plates which are spaced apart; and an inner chamber defined in said exchanger, wherein said inner chamber has a variable width in the predetermined direction, intended for being crossed by an operating fluid, wherein said chamber has at least two successive zones defined along the direction of intended fluid flow, having different widths, in fluid communication with each other, the width within each successive zone being constant.

10. The pseudo-isothermal reactor according to claim 1, wherein said chamber has at least three successive zones defined along the direction of the fluid, having different widths, in fluid communication with each other, the width within each successive zone being constant.

11. The pseudo-isothermal reactor according to claim 9, wherein said chamber has at least three successive zones defined along the direction of the fluid, having different widths, in fluid communication with each other, the width within each successive zone being constant.

* * * * *